United States Patent Office 3,139,893
Patented July 7, 1964

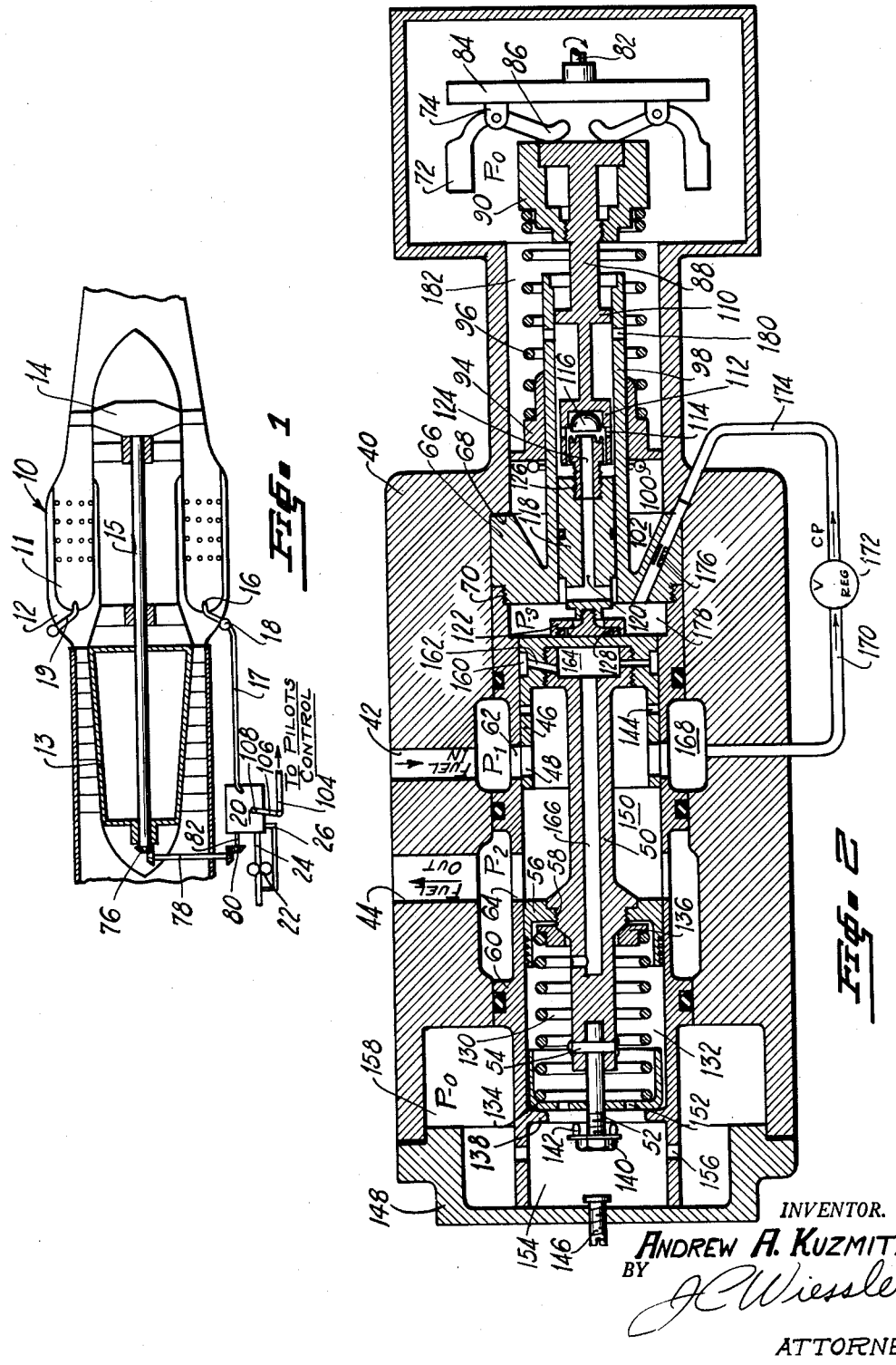

3,139,893
SERVO GOVERNOR HAVING EMERGENCY
CONTROL MEANS
Andrew A. Kuzmitz, South Bend, Ind., assignor to The
Bendix Corporation, a corporation of Delaware
Continuation of application Ser. No. 446,335, July 28,
1954. This application Sept. 5, 1957, Ser. No. 682,570
5 Claims. (Cl. 137—18)

This invention relates to an engine governor mechanism and more specifically to a proportional type governor having a power driven valve particularly adapted for use in a fuel feed system for gas turbine engines. My copending application Serial 670,347, filed July 5, 1957, now U.S. Patent No. 3,092,966, issued June 11, 1963, discloses and claims an adjustable engine speed governor having automatic adjustment means for biasing the governor setting as a function of certain engine operating parameters and a throttle power boost device for minimizing the throttle effort necessary to reset the governor. The instant invention is an improvement of the governor disclosed in said copending application and is readily adapted for combination with the novel governor adjusting means disclosed therein. This application is a continuation of my application Serial No. 446,335, filed July 28, 1954, covering a Governor, now abandoned without prejudice, in view of its being superseded by this present application.

A direct acting governor, such as is disclosed in my copending application, supra, has heretofore enjoyed the advantage of relative simplicity over power-driven governors controlled by servo-mechanisms. A direct acting governor has, however, certain inherent disadvantages such as susceptibility to dirt or other foreign particles in the fuel which may cause sticky governor action, a tendency toward dynamic or static hydraulic pressure unbalance across the governor valve, governor valve hysteresis if valve clearances are kept reasonably close so as to minimize fuel leakage at the ends of the valve, a relatively large gravity or "G" effect due to the necessary relatively large mass of the governor parts, and substantially less than optimum response time. On the other hand, servo-operated governors have heretofore generally suffered disadvantages such as undue complexity, and the lack of a direct-acting standby or emergency governor control means automatically operative in case of a failure of the servo-mechanism.

It is therefore the object of this invention to provide a highly compact and relatively simple servo governor which avoids or minimizes all of the above mentioned disadvantages to which both direct acting governors and servo actuated governors have heretofore been subject.

The foregoing and other objects and advantages will become apparent in view of the following description taken in conjunction with the drawings, wherein:

FIGURE 1 is a sectional view of a turbo-jet engine equipped with a fuel feed and power control device which may include the applicant's governor; and FIGURE 2 is a schematic sectional view of a governor in accordance with the invention.

Referring now to FIGURE 1, a gas turbine engine is generally indicated at 10 and includes a series of annularly disposed combustion chambers 11 mounted in a casing having a header or air intake section 12, and a compressor 13, shown as of the axial flow type, which is driven by means of a turbine 14 through a shaft 15. Each of the combustion chambers is provided with a burner nozzle 16 to which metered fuel is supplied under pressure by way of a conduit 17, fuel manifold 18 and individual fuel lines 19. The conduit 17 receives metered fuel from a fuel control device generally indicated at 20 in FIGURE 1, which includes the applicant's governor as shown in FIGURE 2. A pump 22 supplies fuel under pressure to fuel control 20 through a conduit 24, a portion of which may be by-passed back to the pump inlet through a conduit 26.

Referring now to FIGURE 2, governor mechanism is shown enclosed within a housing 40 which provides for the passage of pressurized fuel at pressure $P_1$ through an inlet conduit 42, which receives fuel from conduit 24, and for the passage of metered fuel at pressure $P_2$ to the conduit 17, manifold 18, and nozzles 16 through a discharge conduit 44. A cup-shaped main metering and governor valve 46 having a plurality of spaced main metering openings 48 in the wall thereof and a valve stem 50, which terminates in a threaded extension 52 pinned at 54 and which is connected to a valve guide 56 at 58, is reciprocable within a sleeve member 60 in which is formed a plurality of annularly arranged inlet openings 62 and like outlet openings 64. A sleeve extension member 66 abuts the housing 40 at 68 and is threadedly connected to sleeve 60 at 70.

A pair of centrifugal weights 72 are pivotally mounted on brackets 74 and are adapted to be rotatably driven by the engine by means of a bevel gear 76, a gear member 78, a bevel gear 80 in mesh with one end of member 78, and a governor drive shaft 82, on one end of which is mounted gear 80 and on the opposite end of which is mounted a drive plate 84 to which brackets 74 are fixedly attached. The centrifugal weights 72 are made integral with foot members 86 which are adapted to continuously abut a flanged end of a member 88 threadedly connected to a spring abutment member 90 which is resiliently connected to a governor spring retainer 94 by a governor spring 96. Spring retainer 94 is slidably mounted on the outer surface of a hollow cylindrical tube section 98 of extension member 66 and may be actuated in an axial direction to vary the degree of compression of spring 96 by means of a bifurcated governor lever 100, suitably mounted in a chamber 102 and actuable by means of a pilot's control lever, not shown, which is connected thereto by a link 104, a lever 106 and a shaft 108 (see FIGURE 1). Member 88, which is formed with a guide land 110 thereon, extends into the cylinder formed by tube 98 and terminates in a hollow cage like member 112, which has a plurality of openings 114 formed in the wall thereof and in which is floatingly mounted a half-ball type servo valve 116.

A member 118 having a fuel passage 120 therethrough is fixedly connected to the governor valve 46 by a coupling 122 and to an orifice member 124, which is mounted in coacting relation with servo valve 116 in cage 112, by a threaded connection 126. All elements thus far described which are mounted for relative movement with respect to sleeve 60 and sleeve extension 66 including governor valve 46, member 118, member 88 and governor weights and spring 72 and 96, are preferably arranged in coaxial relation with each other. In some instances, however, perfect coaxial relation may not exist as a result of manufacturing tolerances and the like, and the coupling 122 is adapted to compensate for slight variations from a coaxial relation between the various elements as a result of the provision of an annular space 128 between the elements of said coupling.

A soft or light governor valve loading spring 130 is mounted in a chamber 132 between spring retainers 134 and 136, said retainer 134 being maintained by said spring in continuous contact with an annular rib 138 on sleeve 60. Spring 130 urges valve 46 in an opening direction and orifice member 124 toward servo valve 116. A flanged nut 140 is mounted on threaded extension 52 and is adapted to limit the maximum open position of governor valve 46 whenever in contact with a bifurcated lever 142, and to establish the minimum open position of said valve, as defined by the total area of a plurality of circumferential deceleration orifices 144, when in contact with an adjustable minimum flow stop 146 mounted in a cover plate 148. The position of bifurcated lever 142 is always a function of certain existing engine operating parameters, such as engine speed and compressor inlet temperature, and may be controlled by mechanism such as is disclosed and claimed in my Patent No. 3,092,966.

A small amount of fuel leakage may be expected to flow past valve guide 56 from metered fuel chamber 150 to chamber 132. Any such leakage is conducted to the inlet of the fuel pump 22 at $P_0$ through the chamber 132, a plurality of openings 152 in detainer 134, and chamber 154, a plurality of openings 156 in sleeve 60, a chamber 158 and conduit 26. Some leakage will also flow from inlet openings 62 past governor valve 46. An annular slot 160 is provided in governor valve 46 for receiving such leakage, said slot being connected to chamber 132 by means of a passage 162, a chamber 164, and a passage 166 in valve stem 50.

An annulus 168 at unmetered or $P_1$ pressure is connected to the inlet side of the fuel pump by means of a conduit 170, a constant discharge pressure regulator valve 172, a conduit 174 having a calibrated restriction 176 therein, a servo pressure ($P_s$) fuel chamber 178 adjacent valve 46, the passage 120, openings 114, the tube 98, a plurality of openings 180 in tube 98, a chamber 182 and conduit 26. The servo pressure in chamber 178 is always a function of the ratio of the area of fixed restriction 176 to the area of orifice member 124, which latter area may be effectively varied by servo valve 116. Any fuel which may leak between governor valve 46 and sleeve 60 from chamber 178 flows into the annular slot 160 and thence to the inlet of the pump at $P_0$ pressure through hydraulic circuitry heretofore described. The described fuel leakage circuits into annular slot 160 from inlet openings 62 and from servo pressure chamber 178 insures that fuel at $P_1$ pressure cannot leak past governor valve 46 into servo pressure chamber 178 to vary the value of $P_s$ pressure in an undesirable manner. With this arrangement, $P_s$ pressure will vary solely as a function of the area ratio between restriction 176 and the orifice member 124.

*Operation*

Assume that the engine 10 has been started and accelerated to a condition of equilibrium or steady state operation in the mid-speed range. The selection of the assumed condition of engine operation is controlled by the pilot who, by means of a control lever, not shown, link 104 and lever 106, may actuate bifurcated governor lever 100 and spring retainer 94 to compress governor spring 96 a predetermined amount, thereby selecting a desired engine speed. At the assumed condition of equilibrium, the force generated by governor weights 72 exactly balances the governor spring force, in which condition cage 112 maintains the servo valve 116 in a fixed position with respect to orifice member 124, member 118, and governor valve 46. So long as this condition exists $P_s$ pressure in chamber 178 does not vary, producing a force on governor valve 46 which is balanced by the force of valve loading spring 130 to establish a fixed metering position of the governor valve. During equilibrium operation nut 140 will be out of contact with both acceleration lever 142 and minimum flow stop 146 and the orifice member 124 will be floating within cage 112 out of contact with the end plate thereof. If, for any reason, engine load should decrease at the assumed governor setting, governor equilibrium would be temporarily upset as a result of the momentary increase in speed; the resulting increase in the force output of weights 72 actuates servo valve 116 toward orifice member 124 thereby increasing $P_s$ pressure to actuate governor valve 46 toward a closed position so as to decrease the fuel flow to engine burners 11 and reestablish engine equilibrium at the decreased load. Should an increase in engine load occur, as with a decrease in altitude, the resulting decrease in engine speed would cause an opening movement of servo valve 116 and governor valve 46 to reestablish equilibrium operation. It is apparent that whenever the engine governor is functioning to control engine speed and fuel flow, the position of governor valve 46 is necessarily dependent on the governor controlled position of servo valve 116.

If the pilot should now desire to accelerate the engine to a higher speed, he will actuate lever 106 in a direction to move governor lever 100 rightwardly to compress governor spring 96, thereby actuating servo valve 116 in an opening direction with respect to orifice member 124 to upset the equilibrium of the governor, which results in a sudden decrease in $P_s$ pressure and opening movement of governor valve 46 until limited by the position of contact between acceleration lever 142 and nut 140. Acceleration lever 142 is controlled by mechanism, not shown, in such a manner that the rate of opening movement of governor valve 46 controls fuel flow so as to avoid an over temperature condition at the turbine inlet and compressor surge or stall at a given altitude. As the engine approaches selected speed, the force output of weights 72 begins to overcome governor spring 96 and actuate servo valve 116 leftwardly to produce governor valve fuel cut-off action. It is apparent that during such cut-off action the governor valve will follow the movement of servo valve 116 and when equilibrium is reached servo valve 116 has established that amount of leakage through orifice member 124 which is necessary to fix $P_s$ pressure and maintain a fixed or equilibrium position of governor valve 46.

My invention inherently affords direct manual control of governor valve 46 in the event that the servo system fails. If, for example, pressure regulator valve 172 should fail in closed position and servo pressure be thereby lost, valve spring 130 would actuate governor valve 46 rightwardly and maintain orifice member 124 in continuous contact with servo valve 116. It is apparent that under such conditions of operation, the pilot could maintain direct manual control of engine operation and could actuate governor valve 46 in either direction to accelerate or decelerate the engine to any selected speed. Of course, with this arrangement, the rate of loading spring 130 would be added to the rate of governor spring 96 so that a given selected position of the pilot's lever would produce a somewhat higher steady state engine speed. This could be readily compensated by backing off the throttle or control lever a certain amount.

From the foregoing it is apparent that my invention fulfills the object thereof, as hereinbefore stated, by providing a very compact, coaxially arranged follow-up servo governor of relatively simple construction which avoids certain problems heretofore encountered in direct acting and servo type governors.

Although only one specific embodiment of my invention has been described, it will be apparent to those skilled in the art that certain variations in design and relative arrangement of parts may be made without departing from the scope of the invention.

I claim:

1. An engine speed governor comprising motive fluid flow regulating valve means, a chamber adjacent said valve means adapted to receive fluid under pressure, said pressure fluid urging said valve means towards closed position, servo-mechanism for varying the pressure of the fluid in said chamber as a function of a preselected engine speed including manually controlled means for selecting the speed of the engine to be controlled by the governor, and means urging said valve means towards open position and becoming effective to establish a mechanical connection between said manual means and said valve means in the event of loss of fluid pressure in said chamber.

2. An engine speed governor comprising motive fluid flow regulating valve means, a valve loading means for urging said regulating means towards open position, a chamber adapted to receive fluid under pressure adjacent said regulating valve means, an extension member secured to said regulating valve means and extending through said chamber, orifice means formed by said extension member external to said chamber and fluidly communicating with said chamber for relieving the fluid pressure therein, servo valve means arranged in substantial coaxial relation with said regulating valve means and said orifice means and adapted to control the effective area of said orifice means, and a pair of rotatable governor weights driven by the engine operatively connected to said servo valve means in substantially coaxial relation therewith, said governor weights being operative to actuate said servo valve means towards said regulating valve means and said orifice following any increment of increase in engine speed during governing of the engine, whereby the fluid pressure in said chamber increases to actuate said regulating valve means towards closed position.

3. An engine speed governor as claimed in claim 2 plus means for selectively adjusting the speed at which the governor weights become effective to actuate said servo valve means towards said regulating valve means.

4. Valve mechanism for controlling the rotative speed of an engine comprising a housing having a cylindrical chamber therein closed at both ends, a valve slidable in said cylindrical chamber and having end portions at opposite ends defining first and second compartments with the closed end portions of said cylindrical chamber, an opening in the side of said cylindrical chamber intermediate the ends thereof, said valve having a portion slidable across said opening to control the flow of fluid therethrough, an inlet conduit for supplying fluid under pressure to said opening, a restricted passage connecting said inlet conduit to said first compartment, said valve having an extension member slidably received through one end of said cylindrical chamber, a fuel passage extending longitudinally of said extension member and communicating with said first compartment and terminating at an outlet orifice, speed responsive means adapted to be actuated by said engine and including a member movable adjacent said outlet orifice, and valve control means adapted to effect direct mechanical connection between said engine speed responsive device and said valve in the absence of fluid pressure in said first compartment.

5. An engine speed governor comprising a housing having an interior chamber, fluid flow regulating valve means slidable in said interior chamber and forming a first and second compartment at opposite ends of said interior chamber, said first compartment containing force producing means operative to urge said valve means in an opening direction, a fluid pressure source, passage means including a restriction therein communicating with said source and said second compartment to supply pressurized fluid thereto, an extension member secured to said valve means and extending out of said interior chamber, said extension member having a longitudinal passage formed therein communicating with said second compartment and terminating at an outlet orifice external to said interior chamber, a servo valve operative with said outlet orifice to control the effective area thereof, speed responsive means responsive to engine speed connected to said servo valve and operative to control the position thereof as a function of engine speed, a throttle member connected to said speed means for varying the controlling effect of said speed means on said servo valve as a function of throttle position, and means operative to establish a mechanical connection between said speed means and said valve means in the event of loss of fluid pressure in said second compartment.

References Cited in the file of this patent
UNITED STATES PATENTS

| | | |
|---|---|---|
| 1,339,939 | Alter | May 11, 1920 |
| 2,371,793 | Bourland | Mar. 20, 1945 |
| 2,616,397 | Ruud | Nov. 3, 1952 |
| 2,646,813 | Mueller | July 28, 1953 |
| 2,669,973 | Parker | Feb. 23, 1954 |
| 2,702,560 | Bobier | Feb. 22, 1955 |
| 2,705,047 | Williams | Mar. 29, 1955 |
| 2,711,158 | Leduc | June 21, 1955 |
| 2,847,020 | Anderson | Aug. 12, 1958 |

FOREIGN PATENTS

| | | |
|---|---|---|
| 516,144 | France | Dec. 3, 1920 |

UNITED STATES PATENT OFFICE
CERTIFICATE OF CORRECTION

Patent No. 3,139,893                     July 7, 1964

Andrew A. Kuzmitz

It is hereby certified that error appears in the above numbered patent requiring correction and that the said Letters Patent should read as corrected below.

Column 3, line 12, after "$P_o$" insert -- pressure --; line 13, for "detainer" read -- retainer --; column 4, line 38, before "spring" insert -- loading --.

Signed and sealed this 9th day of March 1965.

(SEAL)
Attest:

ERNEST W. SWIDER                     EDWARD J. BRENNER
Attesting Officer                     Commissioner of Patents